(12) United States Patent
Strijker

(10) Patent No.: US 10,158,296 B1
(45) Date of Patent: Dec. 18, 2018

(54) METHOD AND SYSTEM FOR SATURATION CONTROL IN A FLYBACK SWITCHED-MODE POWER SUPPLY (SMPS)

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/956,649

(22) Filed: Apr. 18, 2018

(51) Int. Cl.
   *H02M 3/335* (2006.01)

(52) U.S. Cl.
   CPC ... *H02M 3/33523* (2013.01); *H02M 3/33515* (2013.01)

(58) Field of Classification Search
   CPC .................................................. H02M 1/40
   USPC ............................................ 363/21.04–21.11
   See application file for complete search history.

(56) References Cited

U.S. PATENT DOCUMENTS

| | | | |
|---|---|---|---|
| 5,032,967 A | 7/1991 | Marinus et al. | |
| 5,075,837 A | 12/1991 | Feldtkeller | |
| 5,103,386 A | 4/1992 | Herrmann | |
| 6,639,811 B2 | 10/2003 | Hosotani et al. | |
| 6,836,415 B1* | 12/2004 | Yang | H02M 3/33507 363/21.01 |
| 7,719,248 B1 | 5/2010 | Melanson | |
| 7,724,547 B1* | 5/2010 | Zheng | H02M 1/15 323/283 |
| 8,199,538 B2* | 6/2012 | Piper | H02M 3/33507 363/21.13 |
| 9,263,956 B2 | 2/2016 | Tang et al. | |
| 2002/0000796 A1 | 1/2002 | Popescu | |
| 2011/0242859 A1* | 10/2011 | Chang | H02M 3/33523 363/21.18 |
| 2013/0208513 A1* | 8/2013 | Germe | H02M 1/40 363/21.13 |
| 2014/0112030 A1* | 4/2014 | Fahlenkamp | H02M 3/33507 363/21.14 |
| 2014/0328090 A1* | 11/2014 | Takahashi | H02M 3/33507 363/21.17 |
| 2015/0263629 A1* | 9/2015 | Stuler | H02M 3/33546 363/21.02 |

(Continued)

FOREIGN PATENT DOCUMENTS

| | | |
|---|---|---|
| CN | 102364859 A | 2/2012 |
| JP | 2000324683 A | 11/2000 |
| JP | 3707436 B2 | 8/2005 |

OTHER PUBLICATIONS

Ben-Yaakov, S., et al. "A behavioral Spice compatible model of a self-oscillating converter", 20th Annual IEEE Applied Power Electronics Conference and Exposition, vol. 3, pp. 1990-1993 (2005).

(Continued)

*Primary Examiner* — Alex Torres-Rivera

(57) ABSTRACT

Embodiments of a saturation controller for a flyback switched-mode power supply (SMPS) and a method for saturation control for a flyback SMPS involve measuring a length related to a primary stroke in the flyback SMPS, comparing the length related to the primary stroke to a length related to a previous primary stroke in the flyback SMPS to generate a comparison result and adjusting a switching period time of the flyback SMPS based on the comparison result such that saturation of the flyback SMPS is reduced.

20 Claims, 7 Drawing Sheets

(56) References Cited

U.S. PATENT DOCUMENTS

2015/0311778 A1* 10/2015 Chang .................. H02M 1/143
                                                363/21.16
2016/0190935 A1*  6/2016 Lin .................. H02M 3/33507
                                                363/21.12
2017/0222563 A1*  8/2017 Noma .................... H01F 27/24
2017/0345587 A1* 11/2017 White ..................... H01H 9/56

OTHER PUBLICATIONS

Chen, J., et al. "Comprehensive analysis of power loss in the output diode of flyback switching converter operating in DCM and CCM", 2008 International Conference on Electrical Machines and Systems, pp. 1865-1870 (2008).

* cited by examiner

METHOD AND SYSTEM FOR SATURATION CONTROL IN A FLYBACK SWITCHED-MODE POWER SUPPLY (SMPS)

BACKGROUND

Embodiments of the invention relate generally to electrical systems and methods and, more particularly, to power supply circuits and methods for operating power supply circuits.

A power supply circuit generates a desired power (e.g., an output voltage) based on an input power (e.g., an input voltage). For example, a switched-mode power supply (SMPS) converts an input voltage and/or current to a desired output voltage and/or current using a switching power stage. It is desirable to have a switched-mode power supply that converts power efficiently. However, an SMPS may be susceptible to transformer saturation, which can degrade the performance (e.g., the power conversion efficiency) of the SMPS. Therefore, there is a need for a system and method for saturation control in an SMPS.

SUMMARY

Embodiments of a saturation controller of a flyback switched-mode power supply (SMPS) and a method for saturation control in a flyback SMPS involve measuring a length related to a primary stroke in the flyback SMPS, comparing the length related to the primary stroke to a length related to a previous primary stroke in the flyback SMPS to generate a comparison result and adjusting a switching period time of the flyback SMPS based on the comparison result such that saturation of the flyback SMPS is reduced. Other embodiments are also described.

In an embodiment, measuring the length related to the primary stroke in the flyback SMPS involves measuring a signal pulse width at a switch connected to a primary winding of a transformer of the flyback SMPS.

In an embodiment, measuring the signal pulse width at the switch involves measuring the signal pulse width of a signal at a gate terminal of the switch.

In an embodiment, comparing the length related to the primary stroke to the length related to the previous primary stroke in the flyback SMPS to generate the comparison result involves comparing the signal pulse width at the switch with a previous signal pulse width at the switch to generate the comparison result.

In an embodiment, adjusting the switching period time of the flyback SMPS based on the comparison result involves extending the switching period time of the flyback SMPS if the length related to the primary stroke is shorter than the length related to the previous primary stroke.

In an embodiment, adjusting the switching period time of the flyback SMPS based on the comparison result involves reducing the switching period time of the flyback SMPS if the length related to the primary stroke is longer than or equal to the length related to the previous primary stroke.

In an embodiment, adjusting the switching period time of the flyback SMPS based on the comparison result involves adjusting a signal at a switch connected to a primary winding of a transformer of the flyback SMPS based on the comparison result.

In an embodiment, adjusting the signal at the switch based on the comparison result involves adjusting the signal at the switch based on the comparison result, a second signal at the switch and a third signal from an opto coupler of the flyback SMPS.

In an embodiment, adjusting the switching period time of the flyback SMPS based on the comparison result involves adjusting a signal at a gate terminal of a switch connected to a primary winding of a transformer of the flyback SMPS based on the comparison result.

In an embodiment, adjusting the signal at the gate terminal of the switch based on the comparison result involves adjusting the signal at the gate terminal of the switch based on the comparison result, a second signal at a drain terminal of the switch and a third signal from an opto coupler of the flyback SMPS.

In an embodiment, a saturation controller for a flyback switched-mode power supply (SMPS) includes a stroke length detector configured to measure a length related to a primary stroke in the flyback SMPS, a stroke length comparator configured to compare the length related to the primary stroke to a length related to a previous primary stroke in the flyback SMPS to generate a comparison result and a switching period controller configured to adjust a switching period time of the flyback SMPS based on the comparison result such that saturation of the flyback SMPS is reduced.

In an embodiment, the stroke length detector includes a pulse width detector configured to measure a signal pulse width at a switch connected to a primary winding of a transformer of the flyback SMPS.

In an embodiment, the pulse width detector is further configured to measure the signal pulse width of a signal at a gate terminal of the switch.

In an embodiment, the stroke length comparator includes a pulse width comparator configured to compare the signal pulse width at the switch with a previous signal pulse width at the switch to generate the comparison result.

In an embodiment, the switching period controller is further configured to extend the switching period time of the flyback SMPS if the length related to the primary stroke is shorter than the length related to the previous primary stroke.

In an embodiment, the switching period controller is further configured to reduce the switching period time of the flyback SMPS if the length related to the primary stroke is longer than or equal to the length related to the previous primary stroke.

In an embodiment, the switching period controller is further configured to adjust a signal at a switch connected to a primary winding of a transformer of the flyback SMPS based on the comparison result.

In an embodiment, the switching period controller is further configured to adjust the signal at the switch based on the comparison result, a second signal at the switch and a third signal from an opto coupler of the flyback SMPS.

In an embodiment, the switching period controller is further configured to adjust a signal at a gate terminal of a switch connected to a primary winding of a transformer of the flyback SMPS based on the comparison result.

In an embodiment, a method of saturation control for a flyback switched-mode power supply (SMPS) involves measuring a signal pulse width at a switch connected to a primary winding of a transformer of the flyback SMPS, comparing the signal pulse width to a length related to a previous signal pulse width at the switch to generate a comparison result, and adjusting a switching period time of the flyback SMPS based on the comparison result, a second signal at the switch and a third signal from an opto coupler of the flyback SMPS such that saturation of the flyback SMPS is reduced.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
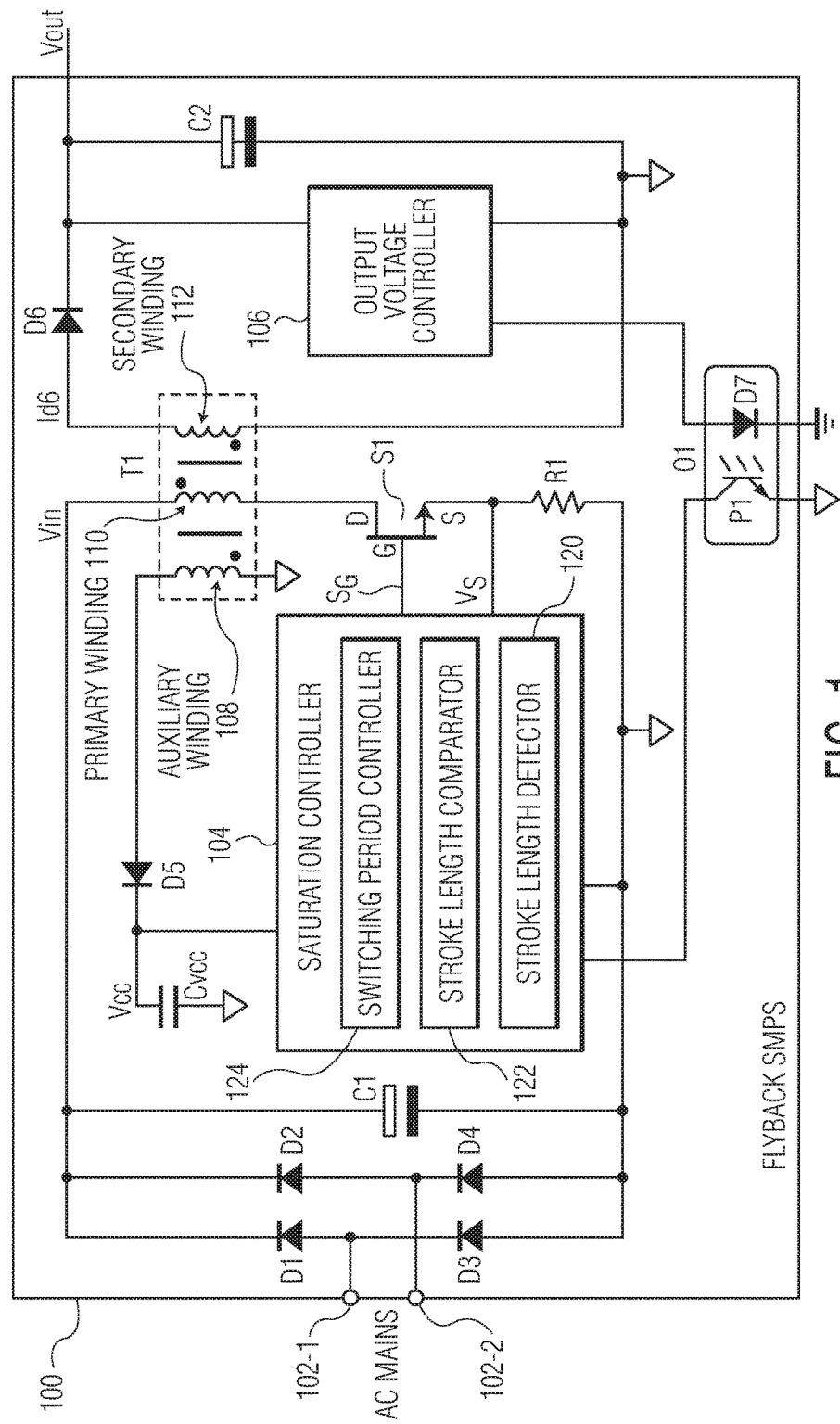
FIG. 1 is a schematic block diagram of a flyback SMPS in accordance with an embodiment of the invention.

FIG. 1 is a schematic block diagram of a flyback SMPS 100 in accordance with an embodiment of the invention. The flyback SMPS converts an input power to a desired output power (e.g., converts an input voltage level to a stable output voltage level for load currents within an acceptable range). For example, the flyback SMPS delivers power available at an input of the flyback SMPS to a load in a controlled manner. In some embodiments, the input power received at the flyback SMPS is Alternating Current (AC) power and the output power is an output voltage, such as a Direct Current (DC) voltage. The flyback SMPS can be used in various applications, such as automotive applications, communications applications, industrial applications, medical applications, computer applications, and/or consumer or appliance applications. For example, the flyback SMPS may be included in a computing device, such as a smartphone, a tablet computer, a laptop, etc. In some embodiments, the flyback converter is a buck-boost converter.

In the embodiment depicted in FIG. 1, the flyback SMPS 100 includes input terminals 102-1, 102-2, bridge rectifier diodes, "D1," "D2," "D3," and "D4," an input capacitor, "C1," a saturation controller 104, a metal-oxide-semiconductor field-effect transistor (MOSFET) switch, "S1," a resistor, "R1," a transformer, "T1," a diode, "D5," a capacitor, "Cvcc," an output diode, "D6," an output capacitor, "C2," an output voltage controller 106, and an opto coupler, "O1." The transformer, T1, includes an auxiliary winding 108, which is connected to a fixed voltage (e.g., the ground) via the diode, D5, and the capacitor, Cvcc, a primary winding 110, which is connected to the MOSFET switch, S1, and a second winding 112, which is connected to the diode, D6, the output voltage controller and the output capacitor, C2. The opto coupler, O1, may include a phototransistor, "P1," and a diode, "D7." In some embodiments, the primary winding is connected to the drain terminal, "D," of the MOSFET switch, S1, the saturation controller is connected to the gate terminal, "G," of the MOSFET switch, S1, and the resistor, R1, is connected to the source terminal, "S," of the MOSFET switch, S1. In some embodiments, at least one of the saturation controller and the output voltage controller is implemented on a substrate, such as a semiconductor wafer or a printed circuit board (PCB). In an embodiment, at least one of the saturation controller and the output voltage controller is packaged as a stand-alone semiconductor Integrated Circuit (IC) chip. Although the flyback SMPS is shown in FIG. 1 as including certain circuit elements, in other embodiments, the flyback SMPS may include one or more additional/different circuit elements. For example, although the flyback SMPS is shown in FIG. 1 as including the MOSFET switch, S1, in other embodiments, the flyback SMPS may include other type of switches.

In the flyback SMPS 100 depicted in FIG. 1, the input terminals 102-1, 102-2 of the flyback SMPS 100 are connected to AC mains, which supply AC power to the input capacitor C1 through the bridge rectifier diodes, D1, D2, D3 and D4. The received energy is transferred to the output capacitor, C2, via the transformer, T1, and the rectifier diode, D6. The output voltage of the flyback SMPS is controlled by the output voltage controller 106 via the opto coupler, O1. The saturation controller 104, which is powered by the auxiliary winding 108 of the transformer, T1, via the rectifier diode, D5, drives the MOSFET switch, S1, to perform saturation control.

In a discontinuous-conduction mode (DCM) operation during a start-up condition of the flyback SMPS 100, the output voltage, Vout, of the flyback SMPS is low and the speed at which the current decreases in the output diode, D6, is slow. If the energy stored in the transformer, T1, is not properly released, the transformer, T1, may saturate. For example, after a first switching period, if not all the energy from the transformer, T1, is transferred to the output capacitor, C2, the current in the diode, D6, will not have dropped to zero yet at the start of the next switching cycle, which will cause the current in the primary winding 110 to start from a non-zero value and the peak current in the transformer, T1, will increase over a voltage threshold, VL. Thus, after every switching cycle, the peak current in the transformer, T1, will increase, resulting in a current run-away and saturation of the transformer, T1, which may cause damages in the flyback SMPS.

In some flyback SMPS implementations, a saturation controller can detect and control transformer saturation or demagnetisation of the flyback transformer, T1, by sensing the zero-voltage crossing on the auxiliary winding 108. In these flyback SMPS implementations, an additional pin or electrical terminal is required in the saturation controller (e.g., a microcontroller IC) for the signal connection between the saturation controller and the auxiliary winding. However, the number of pins in an IC, especially a control IC (e.g., a microcontroller IC), is limited. In some instances, it can be expensive or even impossible to add a new pin to an existing controller IC. The saturation controller 104 is configured to reduce the saturation of the transformer, T1, without the need of an additional pin or electrical terminal. Rather than detecting and controlling transformer saturation or demagnetization of the flyback transformer, T1, by sensing the zero-voltage crossing on the auxiliary winding 108, the saturation controller 104 depicted in FIG. 1 detects and controls the transformer saturation of the flyback transformer, T1, based on the length of primary strokes in the flyback SMPS 100. For example, the saturation controller 104 can measure a length related to a primary stroke in the flyback SMPS 100, compare the length related to the primary stroke to a length related to a previous primary stroke in the flyback SMPS to generate a comparison result and adjust a switching period time of the flyback SMPS based on the comparison result such that saturation of the flyback SMPS is reduced. In some embodiments, the saturation controller 104 is implemented as an IC (e.g., an IC chip) and the transformer, T1, is separate from the IC in which the saturation controller 104 is implemented. Consequently, the saturation controller 104 depicted in FIG. 1 does not require an extra pin for the sensed signal from the auxiliary winding 108. The lower number of pins typically allows a cheaper IC package. In addition, the chip area of the saturation controller 104 can be reduced because no bond pad with Electrostatic discharge (ESD) protection and connected circuitry is needed. Further, the saturation controller 104 depicted in FIG. 1 can be implemented with (i.e., compatible) with existing microcontroller ICs that have predetermined number of pins.

In the embodiment depicted in FIG. 1, the saturation controller 104 includes a stroke length detector 120, a stroke length comparator 122 and a switching period controller 124. In some embodiments, each switching cycle or period of the flyback SMPS 100 includes a primary stroke and a secondary stroke. In the primary stroke of a switching period, the MOSFET switch, S1, is closed (connected) and energy from the AC mains is transferred to the transformer, T1. In the secondary stroke of a switching period, the MOSFET switch, S1, is opened (disconnected) and the energy stored in the transformer, T1, is discharged. In a continuous conduction mode, the MOSFET switch, S1, is controlled such that a primary stroke of the next switching cycle commences before the energy in the transformer, T1, falls to zero during the secondary stroke. In a discontinuous conduction mode, in which the MOSFET switch, S1, is controlled such that a primary stroke of the next switching cycle commences after a delay period has elapsed after the end of the secondary stroke. In some embodiments, the stroke length detector is configured to measure a length related to a primary stroke in the flyback SMPS 100. The stroke length comparator is configured to compare the length related to the primary stroke to a length related to a previous primary stroke in the flyback SMPS to generate a comparison result. The switching period controller is configured to adjust a switching period time of the flyback SMPS based on the comparison result such that saturation of the flyback SMPS is reduced.

In some embodiments, the switching period controller 124 is further configured to extend the switching period time of the flyback SMPS if the length related to the primary stroke is shorter than the length related to the previous primary stroke and to reduce the switching period time of the flyback SMPS if the length related to the primary stroke is longer than or equal to the length related to the previous primary stroke. In some embodiments, the switching period controller is further configured to adjust the signal, $S_G$, at the gate terminal, G, of the MOSFET switch, S1, based on the comparison result, a second signal at the MOSFET switch, S1, and/or a third signal from the opto coupler, O1, of the flyback SMPS.

Figure 2:
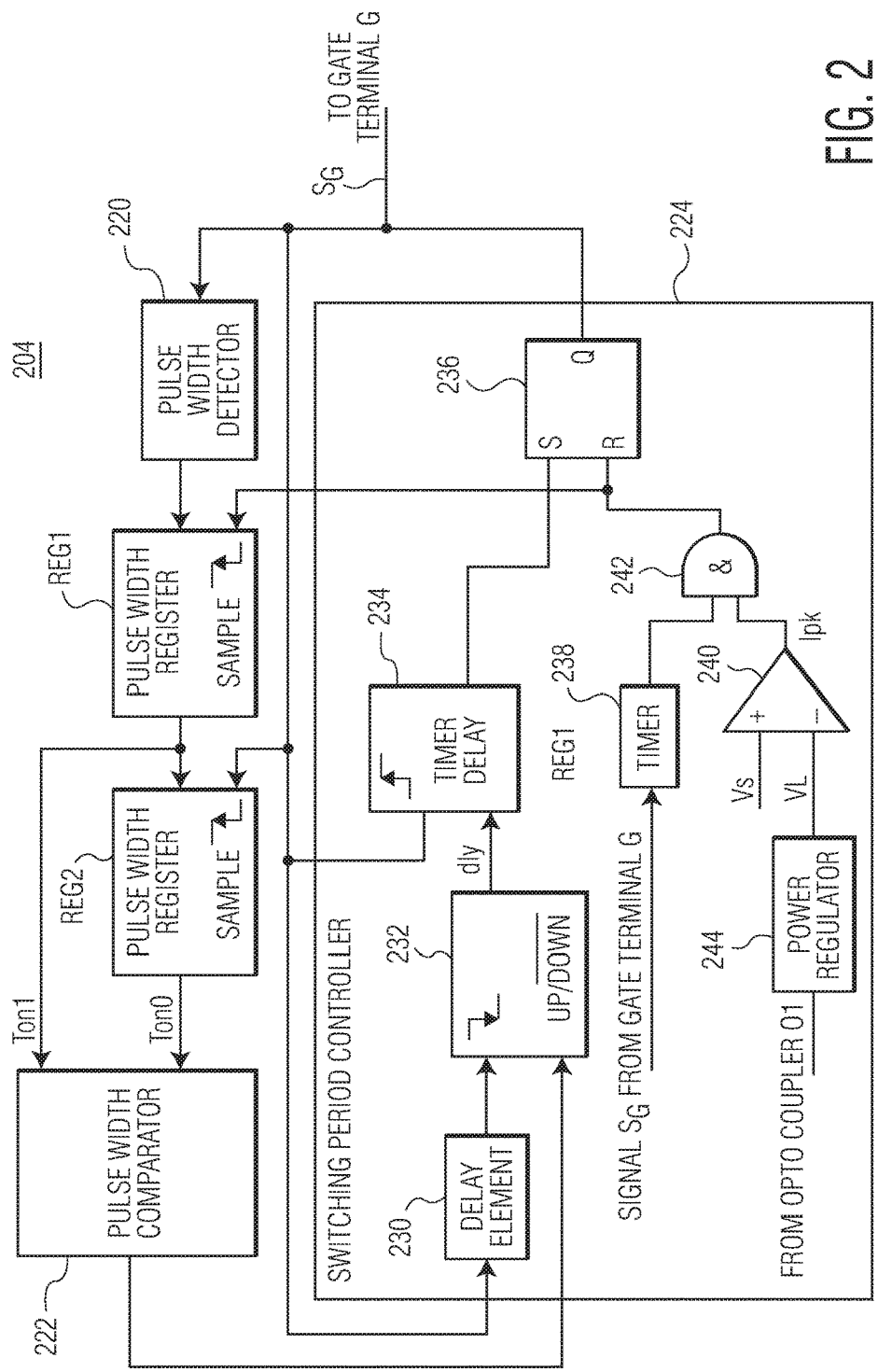
FIG. 2 depicts an embodiment of a saturation controller of the flyback SMPS depicted in FIG. 1.

FIG. 2 depicts an embodiment of the saturation controller 104 of the flyback SMPS 100 depicted in FIG. 1. In the embodiment of FIG. 2, a saturation controller 204 includes a pulse width detector 220, a pulse width comparator 222, a switching period controller 224, and pulse width registers, "Reg1," "Reg2." The switching period controller includes a delay element 230, a register 232, a first timer 234, a flip-flop circuit 236, a second timer 238, a comparator 240, an AND logic 242, and a power regulator 244. The saturation controller depicted in FIG. 2 is a possible implementation of the saturation controller depicted in FIG. 1. For example, the pulse width detector, the pulse width comparator and the switching period controller depicted in FIG. 2 are embodiments of the stroke length detector 120, the stroke length comparator 122 and the switching period controller 124 depicted in FIG. 1, respectively. However, the saturation controller depicted in FIG. 1 can be implemented differently from the saturation controller depicted in FIG. 2.

In the embodiment depicted in FIG. 2, the pulse width detector 220 is configured to measure a signal pulse width of the signal, $S_G$, at the gate terminal, G, of the MOSFET switch, S1, that is connected to the primary winding 110 of the transformer, T1, of the flyback SMPS 100. The pulse width comparator 222 is configured to compare the signal pulse width of the signal, $S_G$, (during the current switching period) with a previous signal pulse width of the signal, $S_G$, (during the previous switching period) to generate a comparison result. The switching period controller 224 is configured to adjust a switching period time of the flyback SMPS based on the comparison result such that saturation of the flyback SMPS is reduced. In some embodiments, the switching period controller is further configured to extend the switching period time of the flyback SMPS if the length related to the primary stroke is shorter than the length related to the previous primary stroke and to reduce the switching period time of the flyback SMPS if the length related to the primary stroke is longer than or equal to the length related to the previous primary stroke. The switching period controller may adjust the signal, $S_G$, at the gate terminal, G, of the MOSFET switch, S1, based on the comparison result, a second signal at the MOSFET switch, S1, (e.g., the voltage signal, $V_s$, at the source terminal, S, of the MOSFET switch, S1), and/or a third signal from the opto coupler, O1, of the flyback SMPS.

An example operation of the saturation controller 204 depicted in FIG. 2 is described as follows. To avoid the need for an additional IC pin to prevent saturation in the transformer, T1, the timing of the signal, "$S_G$," at the gate terminal, G, of the MOSFET switch, S1, is used for transformer saturation control. Specifically, the signal, $S_G$, at the gate terminal, G, of the MOSFET switch, S1, becomes logic high when the first timer 234 sets the flip-flop circuit 236. The gate signal, $S_G$, is reset after the blanking time when the sense voltage, "$V_s$," (i.e., the voltage at the source terminal, S, of the MOSFET switch, S1, that is connected to the primary winding 110 of the transformer, T1), rises above the voltage threshold, VL, at an input of the comparator 240. The pulse width detector 220 measures the pulse width of the gate signal, $S_g$, at the gate terminal, G, of the MOSFET switch, S1. The measured pulse width is stored in the pulse width register, Reg1, when the comparison result, Ipk, from the comparator 240 reaches a peak value ($I_{pk}$=1). The stored pulse width is transferred to the second pulse width register, Reg2, at the start of the next switching cycle, when the gate signal, $S_G$, becomes logic high. The pulse width comparator 222 compares two pulse widths, "Ton0," and, "Ton1," and outputs the comparison results to the register 232, which adjusts its value up or down based on the input signal. The stored value in the register 232 is updated with a short delay from the delay element 230 after the gate signal, $S_G$, becomes logic low. The delay element is required because the output value of the register, Reg1, is also updated when the gate signal, $S_G$, becomes logic low. The small delay generated by the delay element allows the output of the pulse width comparator to settle. The register, 232, outputs a delayed value, "dly," which is used to control the first timer 234, which is triggered on the rising edge of the gate signal, $S_G$. After a delay set by the input signal, dly, the output of the first timer 234 becomes logic high and starts a new switching cycle. The voltage threshold, VL, is set by the power regulator 244, which receives its input from the opto coupler, O1 (shown in FIG. 1). The output power of the flyback SMPS 100 is regulated by the power regulator by adjusting the voltage threshold, VL. Specifically, to increase the output power of the flyback SMPS, the voltage threshold, VL, is increased, and to reduce the output power, the voltage threshold, VL, is reduced.

Figure 3:
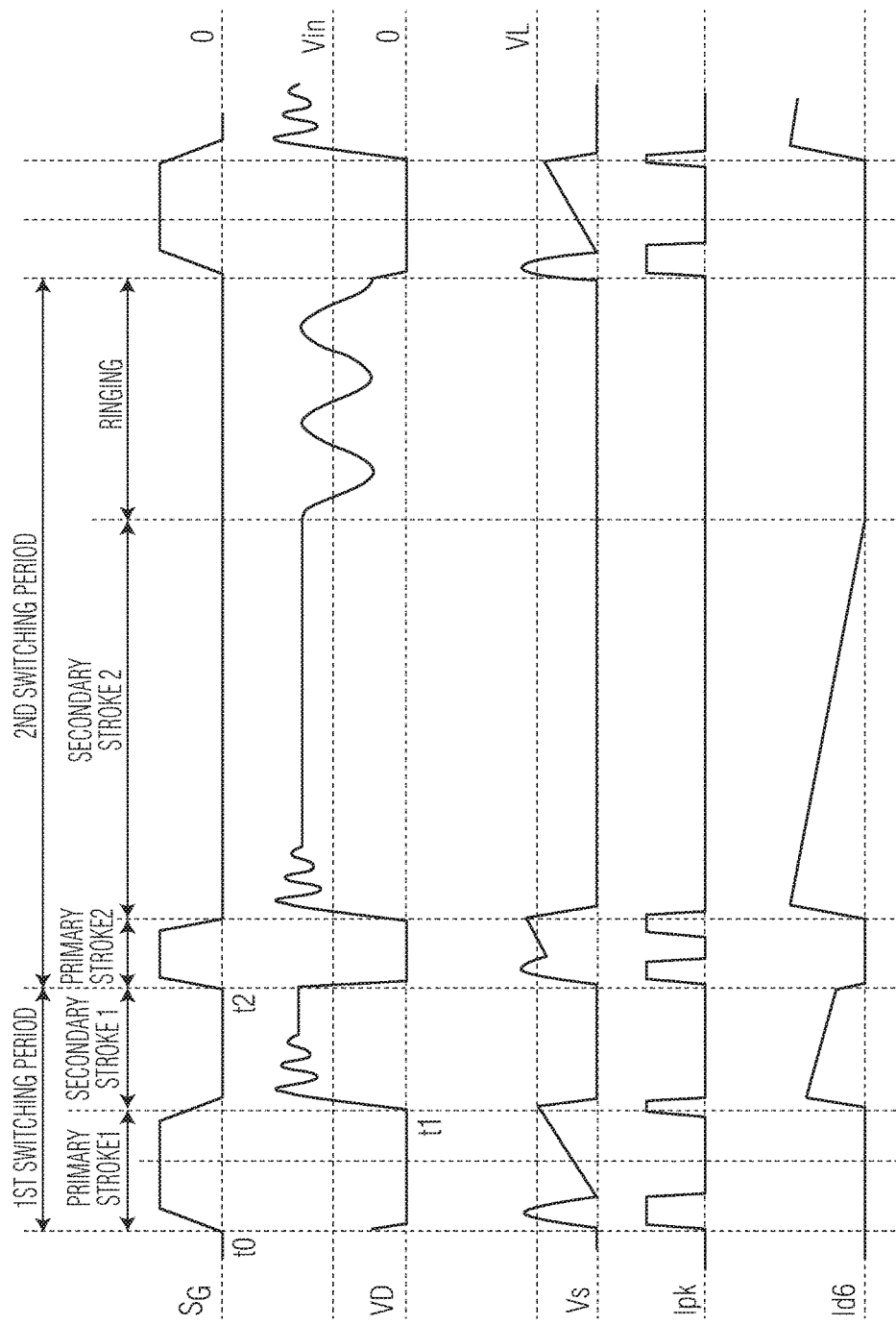
FIG. 3 is a signal timing diagram corresponding to the flyback SMPS depicted in FIG. 1 with the saturation controller depicted in FIG. 2.

FIG. 3 is a signal timing diagram corresponding to the flyback SMPS 100 depicted in FIG. 1 with the saturation controller 204 depicted in FIG. 2. The signals illustrated in FIG. 3 include the signal, $S_G$, at the gate terminal, G, of the MOSFET switch, S1, the drain voltage, $V_D$, at the drain terminal, D, of the MOSFET switch, S1, the sense voltage, $V_s$, the comparison result, $I_{pk}$, from the comparator 240, and the current, Id6, in the output diode, D6.

Figure 4:
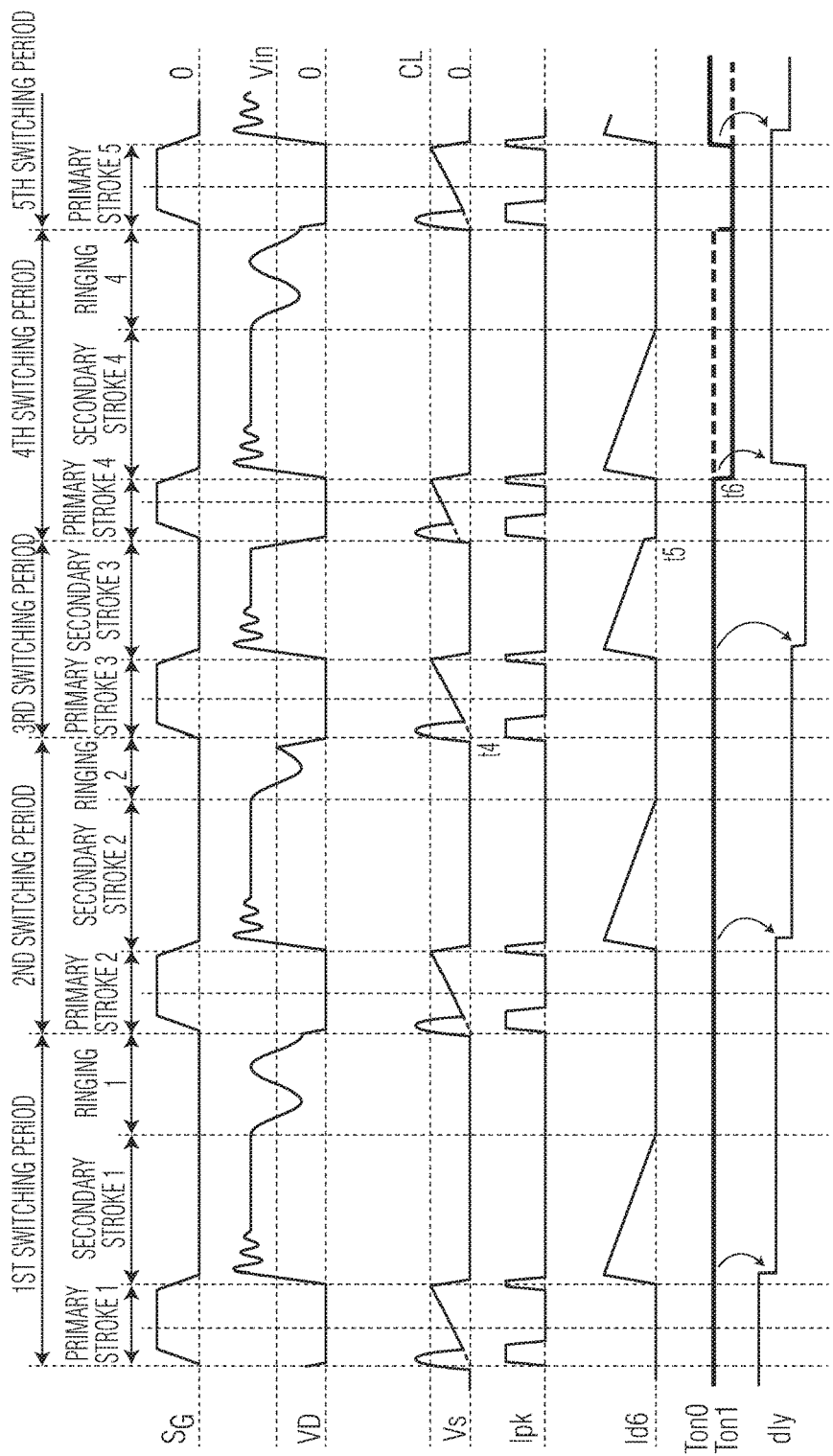
FIG. 4 is another signal timing diagram corresponding to the flyback SMPS depicted in FIG. 1 with the saturation controller depicted in FIG. 2.

In the signal timing diagram depicted in FIG. 4, the switching sequence is drawn for multiple switching cycles. If a shorter primary stroke is detected (for the same voltage threshold, VL), the start of the next primary stroke is delayed, allowing the current, Id6, in the output diode, D6, to drop to zero again. Specifically, at time point, t0, a primary stroke (referred to as the first primary stroke) of a first switching period starts, while at time point, t2, a primary stroke (referred to as the second primary stroke) of a second switching period starts. The length of a primary stroke may be detected by measuring the time duration between time point, t0, in which the signal, $S_G$, rises and time point, t1, in which the signal, $V_D$, rises. The length of the second primary stroke is shorter than the length of the first primary stroke, and the switching period is increased, which allows the current, Id6, in the output diode, D6, to drop to zero. The switching period is increased enough to guarantee the discontinuous operation. After the second secondary stroke, a ringing period appears. The ringing period reflects the free oscillation of the capacitance of the drain terminal, D, of the MOSFET switch, S1, and the primary transformer winding inductance. The flyback SMPS 100 is not active during the ringing period and no energy is built up in the transformer, T1, or released to the secondary side. For the next switching cycle, the switching period can be reduced in small steps until the length of the primary stroke is shorter than the length of a previous primary stroke. Then the switching period is again increased with a larger step. This operation of decreasing the switching period by a smaller step and increasing the switching period by a larger step, resulting in an operation mode which is mostly in discontinuous conduction mode (DCM), and only single switching cycles in continuous conduction mode (CCM). Because the switching period is increased with a larger step and decreased with a smaller step, the flyback SMPS operates under DCM mostly. For example, the flyback SMPS may operate under CCM if the switching period is reduced to 10 microseconds (µs). If the switching period is reduced from 20 µs by 1 µs each switching cycle, after 10 switching cycles, the flyback SMPS starts to operate under CCM. If the switching period is subsequently extended by 5 µs, the flyback SMPS may operate under DCM for the next 5 switching cycles even if the switching period is reduced by 1 µs each switching cycle. In this example, the flyback SMPS operates 1 switching cycle under CCM and 5 switching cycles under DCM. Consequently, there is no current run-away and the transformer is not saturated in this operation mode. Although the switching period is changed in certain manner in FIG. 3, in other embodiments, the switching period may be changed in different manners. For example, smaller/larger steps may be used and the ringing period may be minimized to reduce the non-active time of the flyback SMPS.

FIG. 4 is another signal timing diagram corresponding to the flyback SMPS 100 depicted in FIG. 1 with the saturation controller 204 depicted in FIG. 2. The signals illustrated in FIG. 4 include the signal, $S_G$, at the gate terminal, G, of the MOSFET switch, S1, the drain voltage, $V_D$, at the drain terminal, D, of the MOSFET switch, S1, the sense voltage, $V_s$, the comparison result, $I_{pk}$, from the comparator 240, and the current, Id6, in the output diode, D6, pulse widths, Ton0, Ton1, from the pulse width registers, Reg1, Reg2, and the delayed value, dly, from the register, 232.

In the signal timing diagram depicted in FIG. 4, the switching sequence is drawn for multiple switching cycles. Initially in the first switching cycle/period, the flyback SMPS 100 is in discontinuous conduction mode. The current, Id6, in the output diode, D6, drops to zero before the next switching cycle/period is started. The flyback SMPS is not active during the ringing period and no energy is built up in the transformer, T1, or released to the secondary side. Because the flyback SMPS is not active, the flyback SMPS cannot output the maximum output power and the transformer, T1, is not used to its full potential, which is unwanted because that would require a larger transformer than needed. For the next switching cycle/period (i.e., the second switching period), the switching period is reduced and the ringing time is reduced, which increases the output power. In the next switching cycle/period (i.e., the third switching period), the length of the primary stroke is equal to the length of the first and second primary strokes and the flyback SMPS is still in discontinuous conduction mode. In the third switching period, the current at the primary stroke starts from zero, at time point t4. The third switching period is reduced even further, which results in a situation where not all the energy is transferred to the secondary side. The current, Id6, in the diode, d6, has not dropped to zero before the fourth primary stroke has started, at time point t5. Because there is still energy in the transformer, T1, the sense voltage, $V_s$, also does not start from zero, which results in the sense voltage, $V_s$, reaching the voltage threshold, VL, shortly after the switching cycle starts. The pulse widths, Ton0, Ton1, from the pulse width registers, Reg1, Reg2, are identical to each other in the first, second and third switching periods. In the fourth switching period, the primary stroke is shorter than previous primary strokes and specifically, at time point, t6, the pulse width, Ton0, is narrower/lower than the pulse width, Ton1. Consequently, the saturation controller 204 extends the fourth switching period. Then for the next switching cycle (i.e., the fifth switching period), the flyback SMPS is operating in discontinuous conduction mode again. Although the switching period is changed in certain manner in FIG. 4, in other embodiments, the switching period may be changed in different manners. For example, smaller/larger steps may be used and the ringing period may be minimized to reduce the non-active time of the flyback SMPS.

Figure 5:
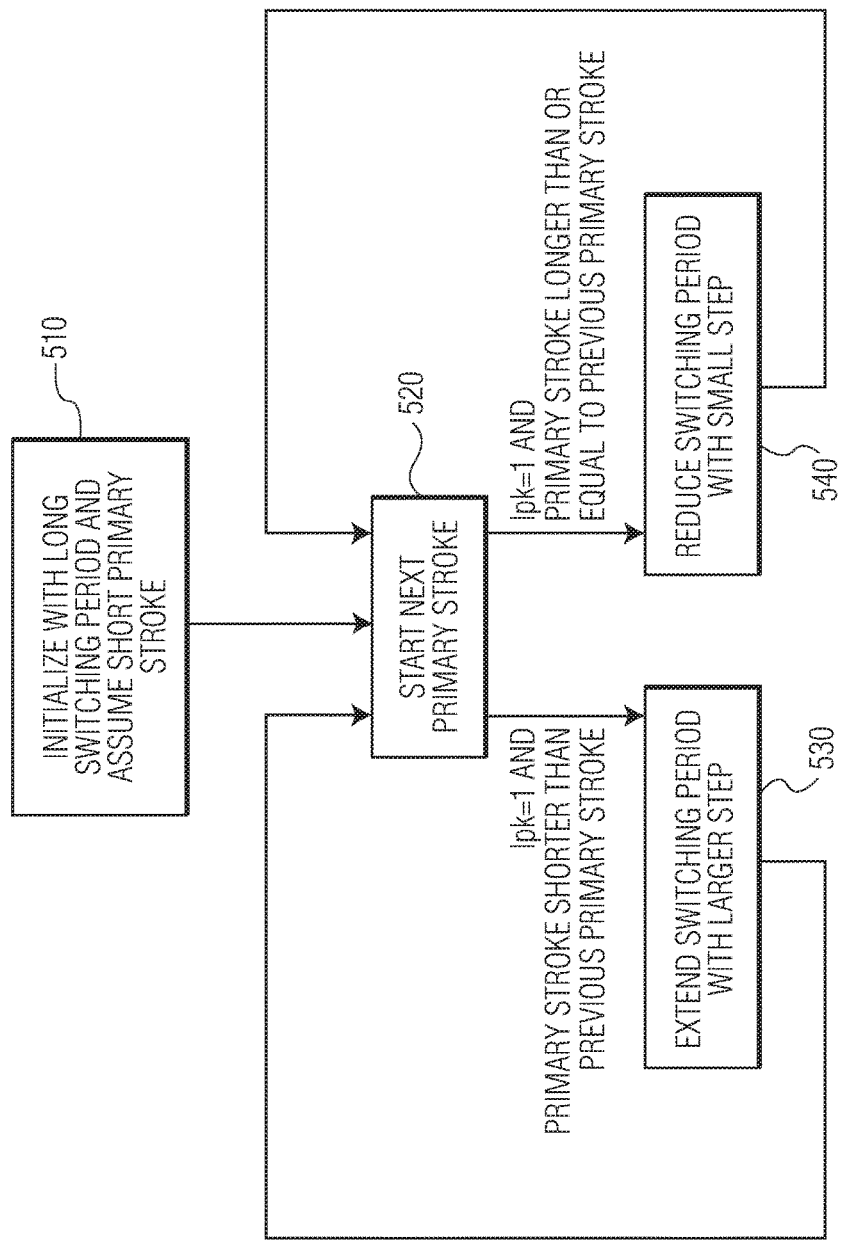
FIG. 5 depicts four operational stages of the saturation controller depicted in FIG. 2.

FIG. 5 depicts four operational stages 510, 520, 530, 540 of the saturation controller 204 depicted in FIG. 2. In the first operational stage 510, a large switching period is set for discontinuous conduction mode. The initial stored value for the primary stroke is short (can be zero). In the second operational stage 520, the first switching cycle/period is started and when the peak value of the comparison result, Ipk, is reached, the length of the primary stroke is compared to the length of the previous primary stroke. For the first switching cycle, the length of the primary stroke is longer than the initial value. In the fourth operational stage 540, the switching period is reduced with a small step for the next switching cycle. For the next switching cycle, the length of the primary stroke is compared again to the length of the primary stroke of the previous switching cycle. If the length of the primary stroke is still longer than or equal to the length of the previous primary stroke, the switching period is reduced further in the fourth operational stage 540. If the length of the primary stroke is shorter than the length of the previous primary stroke, continuous conduction mode operation is assumed and for the next switching cycle the switching period time is extended in the third operational stage 530. In some embodiments, the step for switching period extension is larger than the step for switching period reduction. The operation of reducing and increasing the switching period continues, resulting in an operation mode with only single switching cycles in continuous conduction mode followed by multiple switching cycles is discontinuous conduction mode. Because there are only single cycles in continuous conduction mode, there is no chance for current run-away and transformer saturation. The flyback SMPS 100 can be used to its maximum power while saturation is avoided.

Figure 6:
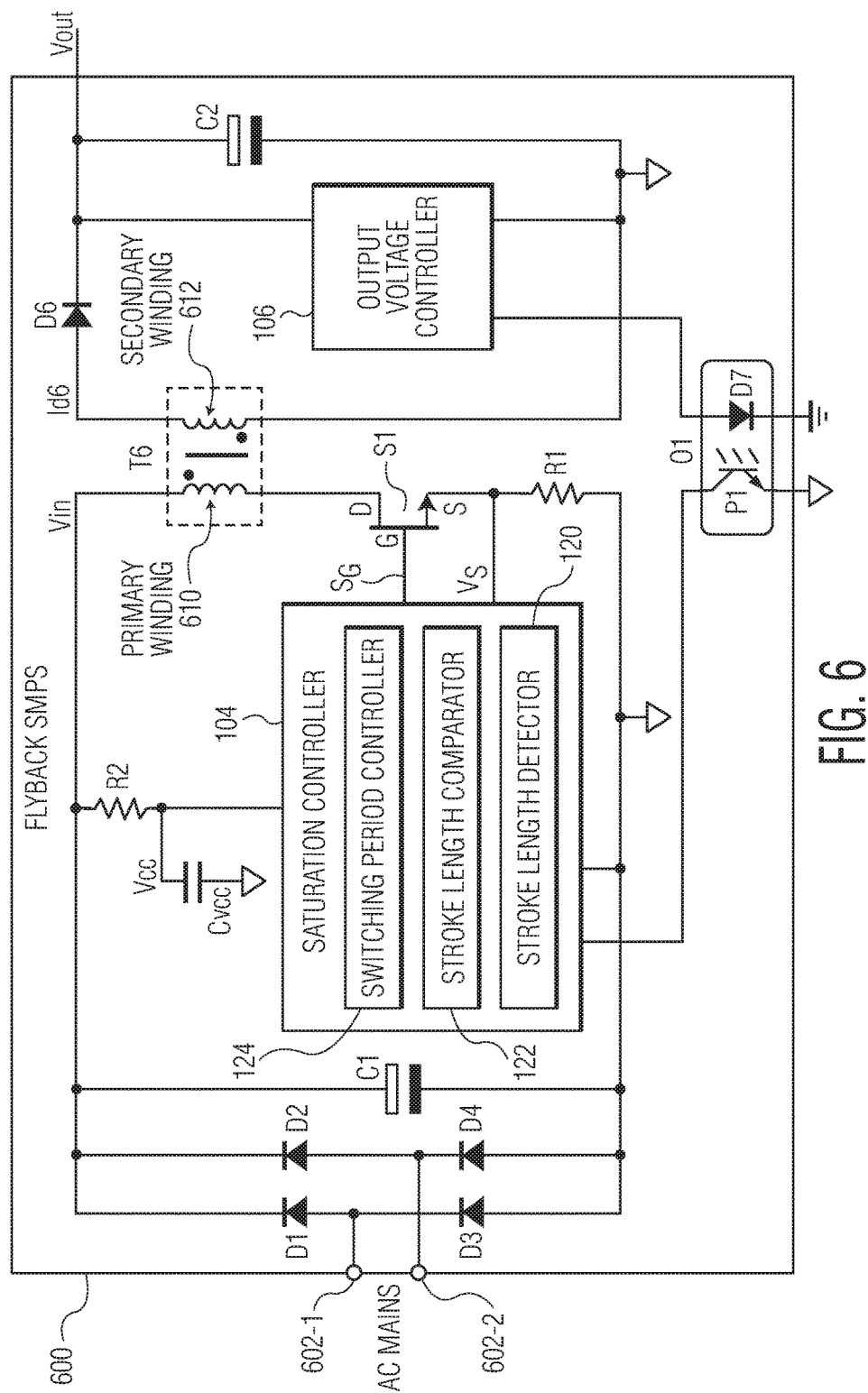
FIG. 6 is a schematic block diagram of a flyback SMPS in accordance with another embodiment of the invention.

In some embodiments, the saturation controller 104 can be used with a transformer that does not include an auxiliary winding. FIG. 6 is a schematic block diagram of a flyback SMPS 600 in accordance with another embodiment of the invention. A difference between the flyback SMPS 600 depicted in FIG. 6 and the flyback SMPS 100 depicted in FIG. 1 is that a transformer, T6, of the flyback SMPS 600 depicted in FIG. 6 does not include an auxiliary winding (e.g., the auxiliary winding 108 included in the transformer, T1, of the flyback SMPS 100 depicted in FIG. 1). Specifically, in the embodiment depicted in FIG. 6, the flyback SMPS includes input terminals 602-1, 602-2, the bridge rectifier diodes, D1, D2, D3, and D4, the input capacitor, C1, the saturation controller 104, the MOSFET switch, S1, resistors, R1, R1, the capacitor, Cvcc, a second resistor, "R2," the transformer, T6, the output diode, D6, the output capacitor, C2, the output voltage controller 106, and the opto coupler, O1. The transformer, T6, includes a primary winding 610, which is connected to the MOSFET switch, S1, and the saturation controller via the resistor, R2, and a second winding 612, which is connected to the diode, D6, the output voltage controller and the output capacitor, C2. The supply voltage, Vcc, for the saturation controller is from the rectified mains voltage, Vin, via the resistor, R2. In some embodiments, at least one of the saturation controller and the output voltage controller is implemented on a substrate, such as a semiconductor wafer or a printed circuit board (PCB). In an embodiment, at least one of the saturation controller and the output voltage controller is packaged as a stand-alone semiconductor IC chip. Although the flyback SMPS is shown in FIG. 6 as including certain circuit elements, in other embodiments, the flyback SMPS may include one or more additional circuit elements. The operation of the flyback SMPS 600 depicted in FIG. 6 is similar to the operation of the flyback SMPS 100 depicted in FIG. 1.

Figure 7:
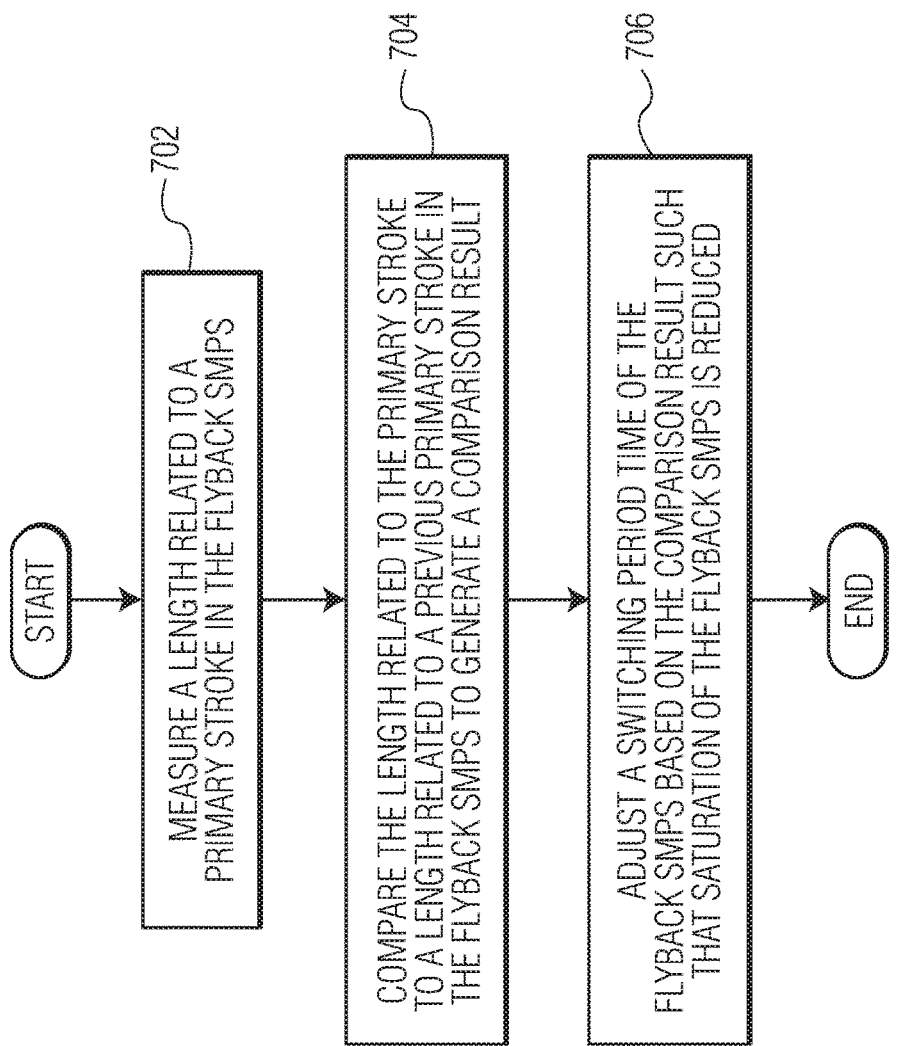
FIG. 7 is a process flow diagram of a method for saturation control for a flyback SMPS in accordance with an embodiment of the invention.

FIG. 7 is a process flow diagram of a method for saturation control for a flyback SMPS in accordance with an embodiment of the invention. At block 702, a length related to a primary stroke in the flyback SMPS is measured. At block 704, the length related to the primary stroke is compared to a length related to a previous primary stroke in the flyback SMPS to generate a comparison result. At block 706, a switching period time of the flyback SMPS is adjusted based on the comparison result such that saturation of the flyback SMPS is reduced. The flyback SMPS may be the same as or similar to the flyback SMPS 100 depicted in FIG. 1 and/or the flyback SMPS 600 depicted in FIG. 3.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of saturation control for a flyback switched-mode power supply (SMPS), the method comprising:
   measuring a length related to a primary stroke in the flyback SMPS;
   comparing the length related to the primary stroke to a length related to a previous primary stroke in the flyback SMPS to generate a comparison result; and
   adjusting a switching period time of the flyback SMPS based on the comparison result such that saturation of the flyback SMPS is reduced.

2. The method of claim 1, wherein measuring the length related to the primary stroke in the flyback SMPS comprises measuring a signal pulse width at a switch connected to a primary winding of a transformer of the flyback SMPS.

3. The method of claim 2, wherein measuring the signal pulse width at the switch comprises measuring the signal pulse width of a signal at a gate terminal of the switch.

4. The method of claim 2, wherein comparing the length related to the primary stroke to the length related to the previous primary stroke in the flyback SMPS to generate the comparison result comprises comparing the signal pulse width at the switch with a previous signal pulse width at the switch to generate the comparison result.

5. The method of claim 1, wherein adjusting the switching period time of the flyback SMPS based on the comparison result comprises extending the switching period time of the flyback SMPS if the length related to the primary stroke is shorter than the length related to the previous primary stroke.

6. The method of claim 1, wherein adjusting the switching period time of the flyback SMPS based on the comparison result comprises reducing the switching period time of the flyback SMPS if the length related to the primary stroke is longer than or equal to the length related to the previous primary stroke.

7. The method of claim 1, wherein adjusting the switching period time of the flyback SMPS based on the comparison result comprises adjusting a signal at a switch connected to a primary winding of a transformer of the flyback SMPS based on the comparison result.

8. The method of claim 7, wherein adjusting the signal at the switch based on the comparison result comprises adjusting the signal at the switch based on the comparison result, a second signal at the switch and a third signal from an opto coupler of the flyback SMPS.

9. The method of claim 1, wherein adjusting the switching period time of the flyback SMPS based on the comparison result comprises adjusting a signal at a gate terminal of a switch connected to a primary winding of a transformer of the flyback SMPS based on the comparison result.

10. The method of claim 9, wherein adjusting the signal at the gate terminal of the switch based on the comparison result comprises adjusting the signal at the gate terminal of the switch based on the comparison result, a second signal at a drain terminal of the switch and a third signal from an opto coupler of the flyback SMPS.

11. A saturation controller for a flyback switched-mode power supply (SMPS), the saturation controller comprising:
    a stroke length detector configured to measure a length related to a primary stroke in the flyback SMPS;
    a stroke length comparator configured to compare the length related to the primary stroke to a length related to a previous primary stroke in the flyback SMPS to generate a comparison result; and
    a switching period controller configured to adjust a switching period time of the flyback SMPS based on the comparison result such that saturation of the flyback SMPS is reduced.

12. The saturation controller of claim 11, wherein the stroke length detector comprises a pulse width detector configured to measure a signal pulse width at a switch connected to a primary winding of a transformer of the flyback SMPS.

13. The saturation controller of claim 12, wherein the pulse width detector is further configured to measure the signal pulse width of a signal at a gate terminal of the switch.

14. The saturation controller of claim 12, wherein the stroke length comparator comprises a pulse width comparator configured to compare the signal pulse width at the switch with a previous signal pulse width at the switch to generate the comparison result.

15. The saturation controller of claim 11, wherein the switching period controller is further configured to extend the switching period time of the flyback SMPS if the length related to the primary stroke is shorter than the length related to the previous primary stroke.

16. The saturation controller of claim 11, wherein the switching period controller is further configured to reduce the switching period time of the flyback SMPS if the length related to the primary stroke is longer than or equal to the length related to the previous primary stroke.

17. The saturation controller of claim 11, wherein the switching period controller is further configured to adjust a signal at a switch connected to a primary winding of a transformer of the flyback SMPS based on the comparison result.

18. The saturation controller of claim 17, wherein the switching period controller is further configured to adjust the signal at the switch based on the comparison result, a second signal at the switch and a third signal from an opto coupler of the flyback SMPS.

19. The saturation controller of claim 11, wherein the switching period controller is further configured to adjust a signal at a gate terminal of a switch connected to a primary winding of a transformer of the flyback SMPS based on the comparison result.

20. A method of saturation control for a flyback switched-mode power supply (SMPS), the method comprising:
- measuring a signal pulse width at a switch connected to a primary winding of a transformer of the flyback SMPS;
- comparing the signal pulse width to a length related to a previous signal pulse width at the switch to generate a comparison result; and
- adjusting a switching period time of the flyback SMPS based on the comparison result, a second signal at the switch and a third signal from an opto coupler of the flyback SMPS such that saturation of the flyback SMPS is reduced.

* * * * *